United States Patent [19]
Tusch

[11] Patent Number: 5,547,734
[45] Date of Patent: Aug. 20, 1996

[54] COVER

[75] Inventor: Klaus N. Tusch, London, England

[73] Assignee: Colebrand Limited, London, United Kingdom

[21] Appl. No.: 306,704

[22] Filed: Sep. 15, 1994

[30] Foreign Application Priority Data

Apr. 11, 1994 [GB] United Kingdom ............... 9407107

[51] Int. Cl.$^6$ ..................................................... B32B 9/00
[52] U.S. Cl. ........................ 428/102; 428/234; 428/246; 428/252; 428/258; 428/263; 428/284; 428/285; 428/300; 428/457; 428/472.2; 428/913; 428/920; 296/39.3; 296/95.1; 296/211; 156/212
[58] Field of Search ..................... 428/74, 119, 172, 428/102, 192, 256, 285, 913, 920, 259, 252, 263, 246, 81, 234, 284, 286, 300, 457, 472.2; 296/211, 95.1, 39.3; 156/212

[56] References Cited

U.S. PATENT DOCUMENTS

| | | | |
|---|---|---|---|
| 3,616,139 | 10/1971 | Jones | 161/68 |
| 4,032,681 | 6/1977 | Jonnes | 428/253 |
| 4,147,829 | 4/1979 | Holland | 428/311 |
| 4,261,649 | 2/1981 | Richard | 350/276 R |
| 4,460,645 | 7/1984 | Jones et al. | 428/323 |
| 4,622,253 | 11/1986 | Levy | 428/91 |
| 4,966,405 | 10/1990 | Tremaine et al. | 296/95.1 |
| 5,016,936 | 5/1991 | Goodrich | 296/39.3 |
| 5,108,817 | 4/1992 | Kidd et al. | 428/192 |
| 5,304,408 | 4/1994 | Jarosz et al. | 428/75 |

*Primary Examiner*—Patrick J. Ryan
*Attorney, Agent, or Firm*—Emrich & Dithmar

[57] ABSTRACT

The invention relates to a cover for shielding an article from incident heat energy and includes a first, non-heat reflective, sheet of material, a second sheet of material adapted to reflect heat, and a layer of non-abrasive sheet material. The sheets are superimposed and secured together to comprise a laminate, with the covering being tailored to provide a desired configuration. The covers are flexible thermal insulation covers tailored to fit and cover a particular shape of article which requires thermal insulation. The cover has spaced round its perimeter pockets or flaps into which are secured extensible members having a free end adapted to be hooked round a part of the article to maintain the cover securely in position.

37 Claims, 1 Drawing Sheet

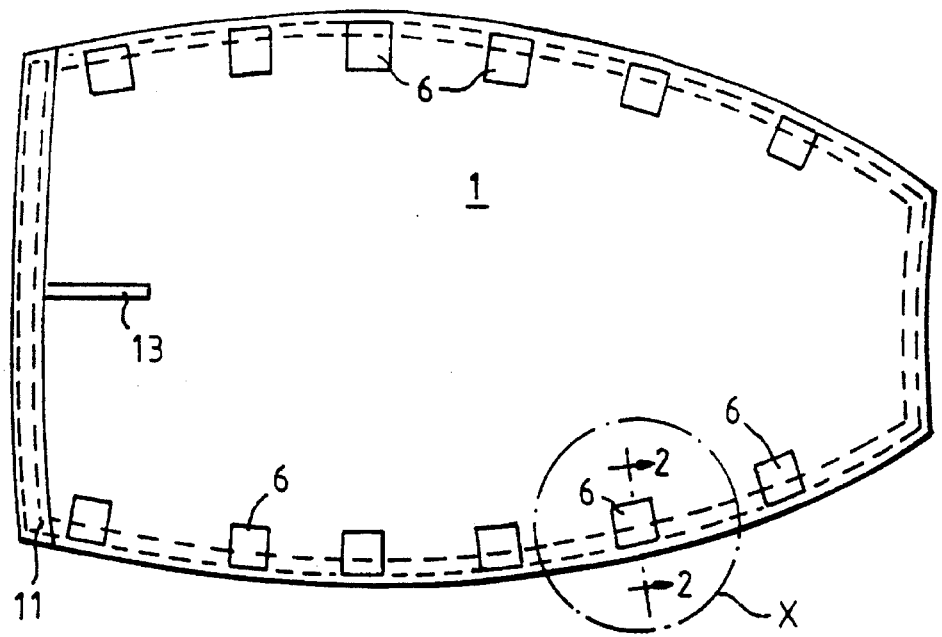
FIG.1
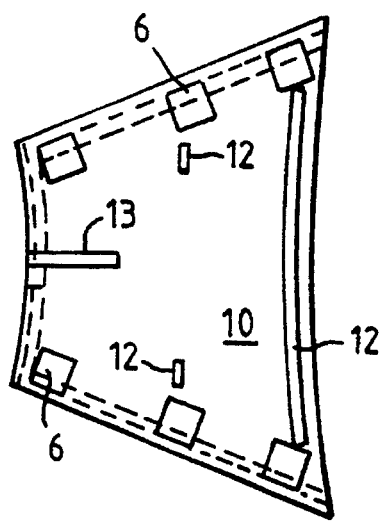
FIG.1A
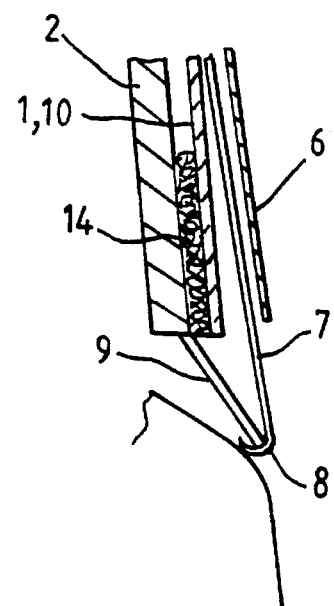
FIG.2
FIG.3

COVER

BACKGROUND OF THE INVENTION

This invention relates to a cover, particularly a flexible cover which may be applied to an article such as a vehicle to protect it from incident heat energy.

Such covers are known, but it is often desirable that they remain in place even when access is required to the article. Hitherto, such covers have to be removed entirely, thereby exposing the whole of the article being protected to incident heat energy, for example from the sun.

SUMMARY OF THE INVENTION

It is accordingly an object of the invention to seek to mitigate this disadvantage.

According to a first aspect of the invention there is provided a cover for shielding an object from incident heat energy, comprising a first, non heat-reflective, sheet of material, a sheet of material adapted to reflect heat, a layer of non-abrasive sheet material, the sheets being superposed to provide a laminate and tailored to provide a desired configuration.

There may be means to secure the cover to an article to be shielded from incident heat energy. This provides a close fit on the article being protected.

The securing means may comprise means having a profile adapted to resemble a profile of a part of an article to be shielded in use. The profile may comprise a hook-like profile.

The securing means may comprise a plurality of hook-like members spaced apart along a perimeter of the cover. This provides for a secure and even mounting of the cover of an article.

The cover may include respective pocket means into which the hook-like means may be retractable. This provides a neat relatively unencumbered construction which may be folded without tangling, particularly if the hook-like members have an extensible part whereby the hook-like profiles are extensible from a respective pocket, and retractable thereinto on release from the part of the article.

The extensible part may comprise a resilient part of the member. This provides a relatively simple means for releasing and engaging the hook profile from the article.

The pocket means may be secured to the sheet of non-heat reflective material. This provides a neat, unitary construction.

The non-heat reflective sheet of material itself may comprise two sheets of material. This provides an optimum construction of the cover. One of the two sheets of material may comprise a waterproof sheet of material.

The waterproof material may also be flame retardant. This provides an additional safety feature.

The said sheet of material may also be decontaminable, for example from nuclear blast contamination.

The said sheet of material may exhibit a relatively low emissivity of incident electromagnetic energy. Thus, the cover may be an absorber of incident microwave band, or radar, frequencies.

These said sheet of material may exhibit a relatively low emissivity of infra-red energy.

The other of the two sheets of material may comprise a woven material. This is a relatively simple constructional method for the said sheet.

The said other sheet of material may comprise an absorber of incident electromagnetic energy in the microwave frequency range.

The sheet of heat reflective material may comprise a sheet of material with a metallic coating, suitably a coating comprising a coating of aluminum or the like such as a aluminum-silver coating. This provides for a consistent reflection of heat energy.

The coating may comprise a paint. This provides for ease of applicability.

The non-abrasive sheet material may comprise a felt, which may be non-inflammable and/or may include non-shrink properties.

The cover may include an additional layer of felt.

The non-abrasive sheet of material may comprise a fur material.

There may be an additional layer of woven material.

The material may comprise a cotton canvas material.

The cover may also include a sheet of relatively smooth material, which may comprise a nylon or silk material.

The material may be waterproof and/or flame retardant and/or decontaminable.

The sheets of material being secured together by securing means to form a laminate structure. This provides for a material which is flexible, foldable, and may be draped round an article.

The securing means may comprise can adhesive, or alternatively, stitching for example to give a quilt-like effect.

The cover may be tailored to a desired shape.

The cover may have means for connection with another, similar, cover. This provides for making a cover which can fit two adjacent parts of the same article.

The connection means may comprise a hook and pile connector.

There may also be means of the two covers for indicating a desired alignment.

The cover may comprise a laminate of a plurality of layers of flexible material, in order from the outer layer (as considered in use), comprising:

(a) a surface layer of material;

(b) a layer of relatively coarsely woven material;

(c) a layer of thermally reflective material;

(d) a layer of non-abrasive material;

(e) a further layer of non-abrasive material;

(f) a further layer of relatively coarsely woven material; and (g) a layer of relatively smooth, relatively tightly woven material.

The relatively coarsely woven material may comprise a cotton canvas material, the non-abrasive material may comprise a felt or fur material and the relatively smooth material a nylon or silk-like material.

The surface layer may be waterproof, and/or flame retardant, and/or decontaminable and/or may be adapted to provide relatively low infra-red emissivity.

The first layer of relatively coarsely woven material may be adapted to provide absorption of incident electromagnetic radiation in the microwave band of frequencies.

The layer of non-abrasive material may be about 1.5 mm thick and may comprise a material which is adapted to be non-inflammable and/or shrink resistant.

According to a second aspect of the invention there is provided an article whenever covered by a cover as hereinbefore defined.

A cover embodying the invention is hereinbefore described, by way of example, with respect to the accompanying drawings.

DESCRIPTION OF THE DRAWINGS

FIG. 1 is a developed plan view of a cover according to the invention;

FIG. 1A is a developed plan of a second cover according to the invention, adapted for connection with the cover of FIG. 1.

FIG. 2 is an enlarged section through detail X of FIG. 1, taken on line 2—2 of FIG. 1; and FIG. 3 is an exploded schematic cross-sectional view of a cover of FIG. 1 or FIG. 1A, which is flexible and comprises a laminate of superimposed layers of sheet material.

DESCRIPTION OF A PREFERRED EMBODIMENT

Referring to the drawings, there is shown a cover 1 or 10 for shielding an article 2 from incident heat energy, comprising a first, non-heat reflective, sheet of material 3, a sheet of material adapted to reflect heat 4, a layer of non-abrasive sheet material 5, the sheets 3 to 5 being superimposed and secured together to comprise a laminate, the cover 1 or 10 being tailored to provide a desired configuration.

In FIGS. 1 and 1A, the covers 1, 10 are flexible thermal insulation covers tailored to fit and cover a canopy of a cockpit 2 of say an aircraft, though they could be tailored to fit any particular shape of article which requires thermal insulation.

The cover 1 of FIG. 1, is in the embodiment 400 cm long, and has spaced round its perimeter pockets or flaps 6 into which are secured as by sewing a member which is extensible as by being made of a suitable material such as a plastic cord 7, one end of which is sewn into the pocket 6 and the free end of which has a hook-like member 8 suitably of metal coated with plastic, adopted to be hooked round a part 9 of the article 2 such as an edge of the canopy, to maintain the cover 1 securely in position round the canopy and stretched thereover. By having an equidistant spacing of the pockets, an even laying out of the cover about the canopy is achieved.

The cover 1, is thus releasably mountable on the article, and, when not in use, can be folded up and stored, the hooks 9 retracting into the respective pockets 6 so as not to become entangled, so that a rapid deployment of the cover 1 can be achieved when an article 2 is required to be covered.

The cover 1 can also be releasably connected with another cover 10, FIG. 1A, about 110 cm long in the embodiment, by for example releasable fastening means such as a hook and pile connection 11 and 12, a strip 11 of which may be on the inside (in use, that is nearest the article) surface of the cover 1 and another strip 12 of which is on the outer surface of the cover 10.

The cover 10 also has retractable hook-like members 7, 8 and as described with reference to FIG. 2, and pockets 6 into which they can retract.

The two covers 1 and 10, may have means 13 such as a colored, for example a red, stripe which are aligned as shown for correct orientation when the covers are joined.

The hook members 7 and 8, and the connectors 11 and 12 ensure that when access to a part of the article is desired, it is not necessary to remove the whole cover 1 or 10, it is merely necessary to unhook some hook members 8, and/or the strip connectors 11 and 12 to provide access to say a windscreen, door, or hatch cover. The remainder of the article 2 thus remains shielded, which can be important in unfavorable climatic conditions such as in a desert.

The section of the cover shown in FIG. 2, shows a fur seal 14 attached to the cover 1, which fur seal 14 is particularly advantageous in obviating the ingress of foreign matter such as sand under the cover and into the article. The fur seal 14 may be a layer of the cover 1, 10 or may be an additional layer round a perimeter edge of the cover 1, 10 which may be of the kind shown in FIG. 3, where the cover is a laminate of a plurality of layers of flexible material, in order from the outer layer (as considered in use), comprising:

(a) a surface layer of material;

(b) a layer of relatively coarsely woven material;

(c) a layer of thermally reflective material;

(d) a layer of non-abrasive material;

(e) a further layer of non-abrasive material;

(f) a further layer of relatively coarsely woven material; and (g) a layer of relatively smooth, relatively lightly woven material.

The outer layer 3 may comprise a layer (a) which may be decontaminable, for example from nuclear blast contamination (NBC); it may also be waterproof and/or flame retardant, and/or adapted to obviate infra-red transmissions, to avoid far infra-red detection. The cover 1, 10 outer layer 3 may also comprise the layer (b) which may be adapted to provide an absorber of incident electromagnetic radiation in the microwave, e.g. radar, frequency band. The layer (e) may be coated as by being painted with an aluminum silver paint.

The layers (d) and (e) may each be of the order of 1.5 mm thick, and may be adapted to be non-inflammable and to have non-shrink properties, suitably by being heated appropriately.

The layer (f) is a relatively coarse weave, like the layer (g) comprising a relatively fine weave material such as nylon or a silk-like material, so is non-abrasive to a surface to which it is applied, i.e. the surface to which the cover is applied. The layer (g), may be decontaminable (NBC), and/or waterproofed, and/or flame retardant.

The layers of material may be glued or stitched together or may be simply sewed together at or adjacent the edges to provide a tailored cover of loose form for maximum flexibility. The layers (e), (h) and (g) provide the layer 5, the inner layer in use of the cover 1 and 10 in the embodiment illustrated.

It will be understood that the laminate may comprise only layer (a)–(d) or (a)–(e), and that the layers (d) or (e), respectively, may comprise fur rather than felt. Alternatively, as in FIG. 2, the fur is an edge strip which is applied to a laminate of layer (a)–(d), (a)–(e) or (a)–(g).

The layer (a), when having infra red quality, avoids detection by thermal imaging devices. Thus the layer (a) may comprise a low emissivity paint, that is a paint which provides a low emissivity of incident electromagnetic energy in the infra-red band.

A typical formulation of a paint according to the invention is

Chlorinated polymer 1–10%

Plasticizing resin 1–10%

Pigment each 1–10%

Dye a small amount, e.g., 1%
Clay thickener 1–10%
Metallic particles 10–60%

The metallic particles preferably comprise silver plated copper flake; aluminum and other reflective particles are also suitable.

Water can be added to provide the consistency required for proper application or a solvent can be substituted, comprising between 10% and 60%.

Suitable pigments include cadmium sulphide P101, iron blue 510D and red oxide 470, particularly as the visible appearance of the paint will be of importance because the paint may have to blend in with ordinary paints and still provide emissivity in the infrared region. Thus, although the paint may appear in visible light as a normal paint, when a painted area is viewed on an article in infrared light, the area will appear in sharp contrast to the adjacent non-painted area because the level of emissivity is reduced by the paint. A typical level of emissivity would be 0.6 or below.

A paint with this formulation is inherently stable and so can be packaged very simply.

The sheet (b) may have the ability to absorb incident electromagnetic energy in the radar waveband, so that there is no reflection thereof. Thus, the sheet (b) may comprise an absorber of incident electromagnetic energy, comprising a first member which is opaque to incident microwave energy and a second member which is electrically conductive, carried by the first member, said first member being intermediate a plurality of second members.

The members may be spaced apart by a material which is permeable to electromagnetic energy.

The members and material may respectively comprise films or sheets which are assembled to provide the sheet (b).

The material or each member may comprise a conductive film or sheet of an electrically non-conductive carrier and a conductive layer thereon.

The material or each carrier may comprise a plastics film or which is deposited a vaporized electrically conductive metallic coating, preferably of aluminum.

The non-conductive sheets may comprise plastics which are opaque, translucent or transparent.

The body may comprise a base member, preferably a sheet or plate of reflective material such as metal.

The electrically conductive member may act as a reflector of the electromagnetic energy which reaches it. All the other layers act as absorbers; they absorb the energy as it travels towards the reflector and they absorb more of it as it travels away from the reflector. The adjustment of layer thickness and relative conductivities enables the best total absorption to be achieved in the waveband of interest.

The embodiment described is non-symmetric, and so will only absorb energy incident from one side. Energy incident from the other side may still be reflected. In order to overcome this problem, a symmetric arrangement may be provided, with an inner, preferably central, electrically conductive layer, thinner conducting layers on either side of the central layer and non-conductive spacing layers on either side of the central layer and non-conductive spacing layers therebetween. There may be further non-conductive layers on the exterior of the thinner conductive layer for protection. As before, the layers may be laminated.

With a symmetrical arrangement in a sheet of the cover, electromagnetic energy incident from either side of the panel may be absorbed and the panel becomes invisible to electromagnetic radiation sensors. The optical absorption can still be minimized by keeping all the layers as thin and transparent as possible.

It will be understood that the provision of the IR-quality or radar absorber modification may not be necessary.

I claim:

1. A cover for shielding an object from incident heat energy, comprising in combination:
   (i) a first, non-heat reflective, sheet of material;
   (ii) a second sheet of material adapted to reflect heat; and
   (iii) a layer of non-abrasive sheet material, wherein said first, second and non-abrasive sheets are superposed to provide a laminate and structurally arranged to provide a desired configuration.

2. A cover as defined in claim 1, including securing means to secure the cover to the object to be shielded from incident heat energy.

3. A cover as defined in claim 2, wherein said securing means comprises means having a hook-like profile adapted to engage a profile of a part of the object to be shielded in use.

4. A cover as defined in claim 3, wherein there is a plurality of hook-like members spaced apart along a perimeter of the cover and wherein there are pocket means into which the respective hook-like members are retractable.

5. A cover as defined in claim 4, wherein the hook-like members each have an extensible part whereby the hook-like profiles are extensible from a respective pocket means, and retractable thereinto on release from the part of the object.

6. A cover as defined in claim 4, wherein the plurality of hook-like members each having an extensible part whereby the hook-like profiles are extensible from a respective pocket, and retractable thereinto on release from the part of the object, and wherein the extensible part comprises a resilient part of the member.

7. A cover as defined in claim 5, wherein the pocket means is secured to the sheet of non-heat reflective material.

8. A cover as defined in claim 1, wherein the non-heat reflective sheet of material itself comprises two separate sheets of material.

9. A cover as defined in claim 8, wherein one of the two sheets of material comprises a waterproof sheet of material.

10. A cover as defined in claim 8, wherein the non-reflective sheet of material itself comprises two separate sheets of material one of which is waterproof and flame retardant.

11. A cover as defined in claim 10, wherein the said sheet of material is also decontaminable.

12. A cover as defined in claim 10, wherein the said sheet of material exhibits a relatively low emissivity of incident electromagnetic energy.

13. A cover as defined in claim 10, wherein the said sheet of material exhibits a relatively low emissivity of infra-red energy.

14. A cover as defined in claim 9, wherein the other of the two sheets of material comprise a woven material.

15. A cover as defined in claim 14, wherein the said other sheet of material comprises an absorber of incident electromagnetic energy in the microwave frequency, range.

16. A cover as defined in claim 1, wherein the sheet of heat reflective material comprises a sheet of material with a metallic coating.

17. A cover as defined in claim 16, wherein the metallic coating comprises a coating of aluminum.

18. A cover as defined in claim 16, wherein the metallic coating comprises an aluminum-silver coating.

19. A cover as defined in claim 16, wherein the metallic coating comprises a paint.

20. A cover as defined n claim 1, wherein the non-abrasive sheet material comprises at least one sheet of felt.

21. A cover as defined in claim 20, wherein the felt is non-inflammable.

22. A cover as defined n claim 20, wherein the felt includes non-shrink properties.

23. A cover as defined in claim 1, wherein the non-abrasive sheet of material comprises a fur material.

24. A cover as defined in claim 1, wherein there is an additional layer of woven material.

25. A cover as defined in claim 24, wherein the woven material comprises a cotton canvas material.

26. A cover as defined in claim 24, wherein the said material comprises material selected from the said group consisting of nylon, silk or artificial silk.

27. A covering as defined in claim 26, wherein the material is waterproof, flame retardant, and decontaminable.

28. A covering as defined in claim 2, wherein the securing means comprises an adhesive.

29. A cover as defined in claim 2, wherein the securing means comprises stitching.

30. A cover as defined in claim 1, wherein there is connection means with another cover member.

31. A cover as defined in claim 30, wherein the connection means comprises a hook and pile connector.

32. A cover as defined in claim 3, wherein there is indicator means on the two covers for indicating a desired alignment.

33. A cover, for shielding an object from incidental heat energy wherein in order from the outer layer to the inner layer a laminate of a plurality of layers of flexible material comprises in combination:

(a) a surface layer of material;

(b) a first layer of relatively coarsely woven material;

(c) a layer of thermally reflective material;

(d) a first layer of non-abrasive material;

(e) a second layer of non-abrasive material;

(f) a second layer of relatively coarsely woven material; and (g) a layer of relatively smooth, relatively tightly woven material.

34. A cover as defined in claim 36, wherein the first and second layers of relatively coarsely woven material comprises a cotton canvas material, the first and second layers of non-abrasive material comprises a material selected from the group consisting of felt and fur, and the layer of relatively smooth material is a selected material from the group consisting of nylon, silk or artificial silk.

35. A cover as defined in claim 34, wherein the surface layer of material is waterproof, flame retardant, decontaminable and adapted to provide relatively low infra-red emissivity.

36. A cover as defined in claim 33, wherein the first layer of relatively coarsely woven material is adapted to provide absorption of incident electromagnetic radiation in the microwave band of frequencies.

37. A cover as defined in claim 36, wherein the first and second layers of non-abrasive material are 1.5 mm thick and comprises a material which is adapted to be non-flammable and shrink resistant.

* * * * *

UNITED STATES PATENT AND TRADEMARK OFFICE
CERTIFICATE OF CORRECTION

PATENT NO.  : 5,547,734
DATED       : August 20, 1996
INVENTOR(S) : Klaus N. Tusch It is certified that error appears in the above-indentified patent and that said Letters Patent is hereby corrected as shown below:

| COLUMN | LINE |  |
|--------|------|---|
| 6 | 8 | After a insert -- third--; |
| 6 | 56 | After frequency delete ","; |
| 6 | 66 | Delete "n" insert -- in --; |
| 7 | 3 | Delete "n" insert -- in --; |

Signed and Sealed this

Twenty-ninth Day of October 1996

Attest:

BRUCE LEHMAN

Attesting Officer

Commissioner of Patents and Trademarks